United States Patent [19]

Norman

[11] Patent Number: 5,312,552
[45] Date of Patent: May 17, 1994

[54] METHOD AND APPARATUS FOR REMOVING BTX-TYPE GASES FROM A LIQUID

[76] Inventor: J. M. Norman, 215 S. Hillcrest Dr., Goldsboro, N.C. 27534

[21] Appl. No.: 12,373

[22] Filed: Feb. 2, 1993

[51] Int. Cl.$^5$ .............. B01D 17/12; B01D 19/00; C02F 1/20
[52] U.S. Cl. .............................. 210/741; 95/19; 95/24; 95/253; 95/257; 95/172; 210/104; 210/134; 210/188; 210/808
[58] Field of Search ............... 210/86, 90, 103, 104, 210/109, 120, 143, 170, 188, 259, 741, 744, 747, 804, 806, 808, 909; 95/19, 24, 253, 254, 257, 266; 96/157, 158, 162-166, 168, 169, 172, 173; 202/205; 203/11

[56] References Cited

U.S. PATENT DOCUMENTS

| | | | |
|---|---|---|---|
| 3,431,708 | 3/1969 | Moore | 95/266 |
| 4,341,534 | 7/1982 | Burger | 95/266 |
| 4,602,923 | 7/1986 | Bernstein | 96/172 |
| 4,704,140 | 11/1987 | Kujala | 95/266 |
| 4,842,748 | 6/1989 | Agnihotri et al. | 210/808 |
| 5,116,515 | 5/1992 | Selesnick | 210/806 |

FOREIGN PATENT DOCUMENTS 714904  9/1954  United Kingdom ............... 210/909

*Primary Examiner*—Joseph W. Drodge

[57] ABSTRACT

The present invention entails a method and an apparatus for removing BTX-type gases from a liquid. Herein is disclosed a system where purified water from an oil-water separator is directed into a vacuum chamber. The chamber is closed and a vacuum is pulled on the purified water causing BTX-type gases associated with the water to vaporize and assume a space in the upper portion of the vacuum chamber. The pressure within the vacuum chamber is continuously sensed as well as the liquid level within the chamber. Once the pressure within the vacuum chamber has reached a predetermined level and the level of the purified water is within a certain range within the vacuum chamber, then the BTX-type gases are removed via a vacuum pump and these BTX gases are collected in a collector where they are condensed to form a liquid.

4 Claims, 2 Drawing Sheets

METHOD AND APPARATUS FOR REMOVING BTX-TYPE GASES FROM A LIQUID

FIELD OF THE INVENTION

The present invention relates to systems and methods for removing gases from liquids and more particularly to a system and method for removing BTX-type gases from water.

BACKGROUND OF THE INVENTION

The danger of BTX-type gases which commonly include benzene, tolulene, xylene and other related gases is well-known. Typically, these gases assume a dissolved gaseous state within a liquid such as water.

Presently, the Environmental Protection Agency requires that purified water separated from an oil-water solution be further purified to remove these BTX-type gases. Conventionally, an air stripper is used to remove these gases from water before that water is returned to our lakes and streams. But there is a serious problem with air strippers. It is highly questionable if a basic air stripper is effective in removing BTX-type gases since gases tend to condense and fall back to the Earth.

Therefore, there is and continues to be a need for a method and system for removing BTX-type gases from water that is effective to control and isolate the BTX gases once removed.

SUMMARY AND OBJECTS OF THE INVENTION

The present invention entails a continuous and automatic modulating-type system for removing BTX gases from a contaminated liquid. In particular, the process entails transferring the contaminated liquid into a vacuum chamber and drawing a vacuum on the contaminated liquid. This effectively boils off the BTX gases and increases the pressure within the vacuum chamber. Once a set of basic conditions is met within the vacuum chamber then by means of a vacuum pump the vaporized BTX gases are withdrawn from the vacuum chamber and collected in a gas collector which in the present case is provided with condensing means for condensing the BTX gases into a liquid. The basic system just described is fully automatic and is designed to operate in a continuous and modulating fashion.

It is therefore an object of the present invention to provide a system and method for efficiently removing BTX-type gases from a contaminated liquid.

Still a further object of the present invention entails a system and method for removing BTX-type gases from a contaminated liquid wherein the process entails maintaining the contaminated liquid under a vacuum, causing the BTX gases to vaporize into an area of the vacuum chamber after which the vaporized BTX gases are removed.

Another object of the present invention is to provide a BTX gas removal and purification system that is compatible with a conventional oil-water separator such that the system and method is capable of operating on water separated from an oil-water solution so as to completely purify the water before the same is returned to sewers, lakes or streams.

Another object of the present invention resides in a method or process for removing BTX-type gases from a contaminated liquid wherein the process is operated automatically and continuously in a modulating manner.

Another object of the present invention resides in the provision of a process for removing BTX gases of the character referred to above which is effective to remove the gases to a level of 5 ppb or lower.

Other objects and advantages of the present invention will become apparent and obvious from a study of the following description and the accompanying drawings which are merely illustrative of such invention.

DETAILED DESCRIPTION OF THE INVENTION

With further reference to the drawings, the system for removing BTX-type gases from a liquid is shown therein. The basic system components comprise an oil-water separator indicated generally by the numeral 10 and a BTX separator indicated generally by the numeral 12. As will be appreciated from the subsequent disclosure, the oil-water separator 10 and BTX gas separator 12 are designed to work in conjunction with each other. However, the BTX gas separator 12 may be employed independently of the oil-water separator 10.

Figure 1:
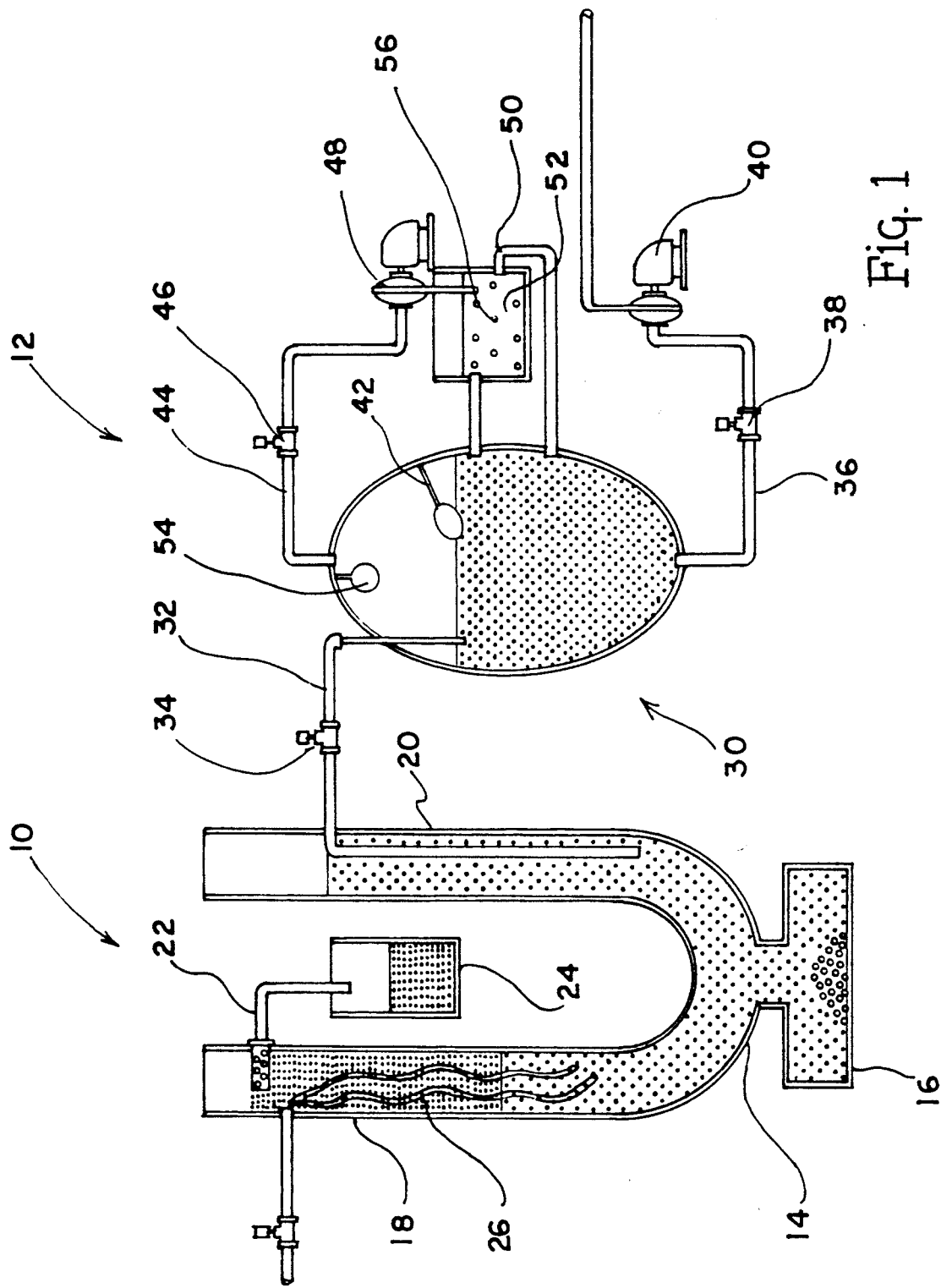
FIG. 1 is a schematic illustration of the BTX gas removal system of the present invention.
Figure 2:
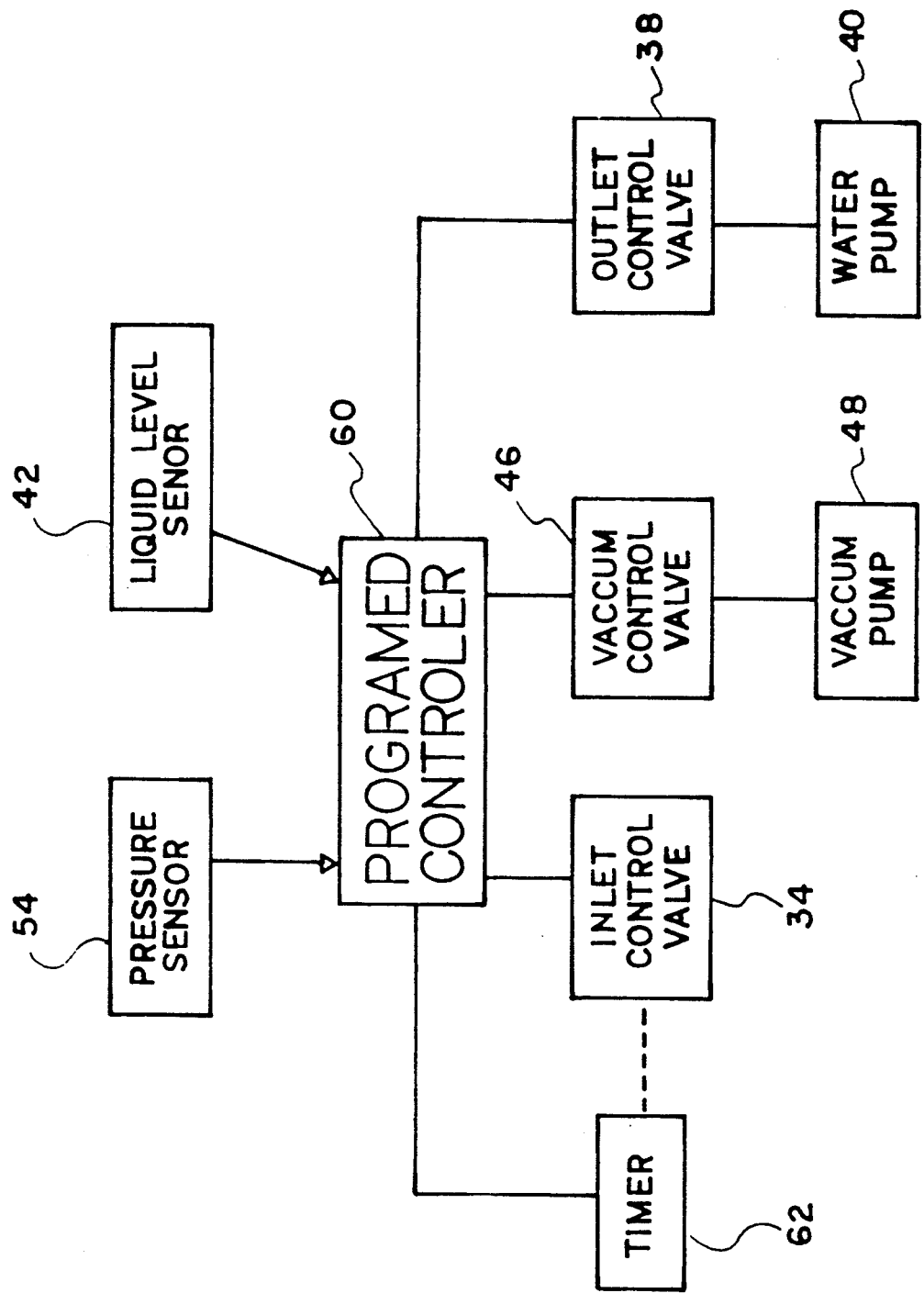
FIG. 2 is a schematic illustrating a computerized control system for controlling the BTX gas removal system of the present invention.

Now turning attention to the BTX gas separation system of the present invention and particularly to the oil-water separator 10, it is seen that the oil-water separator 10 includes a U-shaped column 14. Disposed below the U-shaped column 14 is a solids collector 16. Viewing the U-shaped column 14 in more detail it is seen that the same includes a primary column 18 and a secondary column 20. Primary column 18 is operative to receive oil-water mixtures from a wide variety of sources. The upper portion of primary column 18 is provided with a serpentine corrugated coil 24 that lies in the path of the downward moving oil-water mixture. In conventional fashion the serpentine corrugated coil tends to facilitate oil and water separation of the mixture being treated. As will be appreciated by those skilled in the art, because of the differences in specific gravity between oil (and other petroleum compositions) and water, the oil solution will tend to rise to the top of an oil-water liquid mixture. Thus, as shown in FIG. 1, the upper portion of the primary column 18 will tend to house and contain an oil-type solution while the purified or separated water will move down the primary column and over into the secondary column 20. Thus, in order to remove the oil mixture from the solution, a skimmer device 22 is communicatively connected to the upper portion of the primary column 18 and is designed to continuously skim off the separated oil solution that lies at the top of the primary column 18. As already pointed out, the top portion of the liquid housed within the secondary column 20 is purified or separated water. In this disclosure, the use of the term "purified" simply means that the solution has gone through a process where oil is separated from the same. However, the purified liquid existing about the upper portion of the secondary column 20 includes dissolved BTX gases such as benzene, tolulene, xylene and others. As indicated in the background of the invention, it is now important to remove these BTX gases, that exist in a dissolved state within the liquid solution, before the solution is released into creeks, streams, sewers and other bodies of water.

To separate BTX gases that assume a dissolved state within a liquid, the present invention provides a vacuum chamber indicated generally by the numeral 30. As shown in the drawings, there is provided an inlet line 32 that extends from the upper portion of secondary column 20 into the vacuum chamber 30. To control the flow of material from the oil-water separator 10 into the vacuum chamber 30 there is provided an inlet control valve 34 that is interconnected within inlet line 32.

Vacuum chamber 30 is also provided with an outlet line 36. Outlet line 36 includes an outlet control valve 38 for controlling the flow of liquid from the vacuum chamber 30 out outlet line 36. Also, a water pump 40 is connected in the outlet line 36 and is operative to pump contaminant free liquid solution from the vacuum chamber 30 out the outlet line 36.

In order to control the flows into and out of the vacuum chamber 30, there is provided a level sensor 42. The level sensor 42 is mounted within the vacuum chamber 30 and acts to float up and down with the level of the liquid within the vacuum chamber. As indicated in the drawings, the level sensor or indicator 42 is directly coupled within the water pump 40 connected in the outlet line 36. This enables the level indicator to control the flow of liquid from the vacuum chamber through the outlet line 36.

Extending from the vacuum chamber 30 is a vacuum line 44 that includes a control valve 46 disposed therein. Vacuum line 44 extends to and is operatively connected to a vacuum pump 48. Disposed at the terminal end of vacuum line 44 is a gas collector 50 that includes a liquid 52 housed within a container that also includes a network of condensation coils 56. It will be appreciated that the process itself tends to cool the liquid within the vacuum chamber. To make the gas collector 50 as efficient as possible, the same is communicatively connected to the vacuum chamber 30 such that liquid within the vacuum chamber itself is continuously circulated through the gas collector. Consequently, the liquid 52 found in the gas collector 50 is the same liquid found in the vacuum chamber 30. As will be appreciated from subsequent portions of this disclosure, BTX gases removed from the vacuum chamber will be dispersed into the liquid 52 and because of the condition in the liquid and because of the condensation coil 56, the BTX gases will be condensed into a liquid form so as to make it easier for such gases to be handled.

Finally, the vacuum chamber 30 includes a pressure sensor 54 disposed within the upper portion of the vacuum chamber 30. The function of the pressure sensor 54 is to sense the pressure within the upper voided area of the vacuum chamber. This sensed pressure, as will be understood from subsequent portions of this disclosure, will be utilized to control various control valves forming a part of the BTX gas removal system and will consequently control various flows into and out of the vacuum chamber 30.

The BTX gas removal system just described will be designed so as to maintain a modulating control over the flows into and out of the vacuum chamber.

As indicated before, the vacuum chamber will function to vaporize BTX-type gases that assume a dissolved state within the liquid within the vacuum chamber. As the pressure within the vacuum chamber 30 is reduced, these BTX-type gases are separated from the liquid by a vaporization process. Thus, as viewed in FIG. 1, the vaporized gases move from the liquid into the open chamber area above the liquid. The inlet control valve 34 is operatively connected to the level sensor or indicator 42. In addition, the inlet control valve 34 is operatively connected with the pressure sensor 54. This enables one to control the flow from the secondary column 20 into the vacuum chamber 30 according to the liquid level within the vacuum chamber 30 and the vacuum or pressure within the upper portion of the vacuum chamber 30. More particularly, the control system is designed to open inlet control valve 34 in response to the liquid level falling below a threshold level within the vacuum chamber 30 and there being a sufficient vacuum within the upper portion of the vacuum chamber. Essentially, there is set a threshold vacuum and in order for inlet control valve 34 to be opened there must be sufficient vacuum present before inlet control valve 34 is actuated to the "on" state.

To discharge liquid from the vacuum chamber 30, and to accordingly actuate outlet valve 38, several conditions must exist. First, the liquid level within the vacuum chamber must be above a threshold value. In addition, the inlet control valve 34 and the vacuum line control valve 46 must both be in the "off" state. At this time, the outlet control valve 38 can be automatically opened and the water pump 40 actuated to draw liquid or water from the vacuum chamber 30. Since the vacuum chamber is closed the act of drawing down the liquid or water within the vacuum chamber will give rise to the generation of a vacuum within the upper portion of the vacuum chamber 30.

To remove BTX gases, the vacuum line control valve 46 is only actuated when the pressure within the upper portion of the vacuum chamber reaches a predetermined pressure level and when the liquid level within the vacuum chamber has moved past a selected threshold value. At that time the vacuum line control valve 46 is automatically opened and the vacuum pump 48 is actuated causing BTX-type gases from the upper portion of the vacuum chamber to flow through the vacuum line 44 into the gas collector 50 where BTX-type gases are condensed.

It is contemplated that the pressure level within the vacuum chamber will be maintained at approximately 6 psi or one-half of a vacuum. However, that pressure level can vary depending on circumstances and conditions. The important criteria here is that there be sufficient vacuum to effectuate the vaporization of the BTX-type gases. As pointed out above, the control for the BTX gas separation system of the present invention is ideally a modulating control wherein the respective flow lines are automatically turned on and off such that there is a continuous modulating flow of fluid into and out of the vacuum chamber 30 as well as a continuous and modulating flow of BTX gases from the vacuum chamber to the gas collector 50.

Therefore, it is appreciated that in the BTX separator control system just described that the two parameters that form the central control for the total system comprise the liquid level sensor or indicator 42 and the pressure sensor 54. It is contemplated that the liquid level data and the internal pressure data would be continuously fed into a programed controller 60 and that controller would in turn utilize the data supplied to control the flow of fluid to and from the vacuum chamber 30. In particular, as stated herein before, the controller 60 would be operatively connected to the inlet control valve 34 for controlling the same. The actuation of the inlet control valve 34 is dependent upon the pressure within the vacuum chamber 30 and the liquid level within that same vacuum chamber. Once threshold values for both the pressure and liquid level have been reached the controller 60 would actuate the inlet control valve 34 that would be open for a selected time. Once the inlet control valve reaches an open state the same is controlled by a timer 62.

The vacuum line control valve 46 and the vacuum pump 48 are solely controlled by the pressure within the vacuum chamber 30. Consequently, the controller would actuate both the vacuum line control valve 46 and the vacuum pump 48 in response to the pressure within the vacuum chamber 30 reaching a threshold value. Once the pressure falls below a set point value the vacuum line control valve 46 is closed and the vacuum pump 48 shuts off.

Finally, the outlet valve 38 and water pump 40 are controlled solely by the liquid level within the vacuum chamber 30. Once the liquid level within the vacuum chamber 30 reaches a threshold value then the controller will actuate both the outlet valve 38 and the water pump 40 so as to pull contaminant-free liquid from the vacuum chamber. Once the liquid level falls below a set level then the valve 38 and pump are shut off.

It is appreciated that during the control process as outlined above, that only one basic control system will be operated at a time. That, of course, means that when the inlet control valve 34 is open that the other control valves, namely vacuum line control valve 46 and outlet valve 38 would be closed.

The present invention may, of course, be carried out in other specific ways than those herein set forth without parting from the spirit and essential characteristics of the invention. The present embodiments are, therefore, to be considered in all respects as illustrative and not restrictive, and all changes coming within the meaning and equivalency range of the appended Claims are intended to be embraced therein.

What is claimed is:

1. A system for separating oil and water and then separating BTX type gases from the separated water comprising:
   a) an oil-water separator for separating water from an oil-water solution;
   b) a vacuum system associated with the oil-water separator for separating BTX-type gases from the water separated from the oil-water solution;
   c) the vacuum system comprising:
      1) a vacuum chamber;
      2) an inlet line connected between the oil-water separator and the vacuum chamber and having an inlet control valve;
      3) an outlet line extending from the vacuum chamber and including an outlet control valve;
      4) pump means communicatively connected in the outlet line for pumping purified water from the vacuum chamber and effective in generating a vacuum within the vacuum chamber;
      5) liquid level control means associated with the vacuum chamber for sensing the liquid level within the vacuum chamber and actuating the pump means and the outlet control valve for selectively causing purified water to be pumped from the vacuum chamber via the outlet line;
      6) a gas collector associated with the vacuum system;
      7) a vacuum line extending from the vacuum chamber to the gas storage collector and including a vacuum line control valve for opening and closing the vacuum line;
      8) vacuum pump means communicatively connected to the vacuum line for pumping toxic gases that have been vaporized in the vacuum chamber from the vacuum chamber into the gas collector; and
      9) a pressure sensor associated with the vacuum chamber for sensing the pressure therein and actuating the vacuum pump in response to the pressure within the vacuum chamber rising above a selected threshold value such that vaporized toxic gases can be pumped from the vacuum chamber and wherein the pumping of purified water from the vacuum chamber creates a vacuum in the top portion thereof that effectively vaporizes BTX gases dissolved within the water and wherein the vaporized BTX gases are contained within an upper compartment formed in the vacuum chamber.

2. A method for removing BTX-type gases from water separated from an oil-water solution comprising the steps of:
   a) transferring purified water from an oil-water separator to a vacuum chamber;
   b) effectively sealing the vacuum chamber and drawing a vacuum on the vacuum chamber and vaporizing BTX-type gas from the purified water and containing the vaporized BTX-type gases in the upper part of the vacuum chamber;
   c) removing vaporized BTX-type gases from the vacuum chamber and storing the removed BTX-type gases in a gas collector, the step of removing vaporized BTX-type gases including sensing that pressure within the vacuum chamber and the level of purified water within the vacuum chamber and expelling vaporized BTX-type gases from the vacuum chamber when the pressure within the vacuum chamber has exceeded to threshold value and the level of purified water within the vacuum chamber has reached a selected level; and
   d) sensing the level of purified water within the vacuum chamber and the pressure within the vacuum chamber and transferring additional purified water from the oil-water separator to the vacuum chamber in response to the level of purified water and the vacuum within the vacuum chamber respectively, reaching threshold levels.

3. The method of claim 2 including the step of condensing the removed BTX-type gases into a liquid.

4. The method of claim 2 including the step of periodically removing the purified water from the vacuum chamber in response to the purified water reaching a selected level within the vacuum chamber.

* * * * *